Sept. 30, 1969  R. A. MONTGOMERY ET AL  3,469,733
RUPTURE DISC UNIT
Filed Oct. 31, 1967

INVENTORS
Rayner A. Montgomery
Earl E. Kilmer

BY Jack C. Goldstein
AGENT
J. O. Tresansky
ATTORNEY

United States Patent Office 3,469,733
Patented Sept. 30, 1969

3,469,733
RUPTURE DISC UNIT
Rayner A. Montgomery, Silver Spring, and Earl E. Kilmer, College Park, Md., assignors to the United States of America as represented by the Secretary of the Navy
Filed Oct. 31, 1967, Ser. No. 679,321
Int. Cl. B65d 47/36, 25/38
U.S. Cl. 220—89                     3 Claims

ABSTRACT OF THE DISCLOSURE

A rupture disc unit having a plate in which is scored a groove in the shape of a U. A strip of explosive material is bonded over the groove and a detonator is positioned in close proximity to the explosive material.

BACKGROUND OF THE INVENTION

This invention relates generally to rupture disc units and more particularly to units which may be utilized for sealingly closing a receptacle surrounded by or containing high pressure fluid, yet capable of being selectively opened to permit flow of the fluid past the disc and into the receptacle or out of the receptacle, respectively.

A need has existed for a device for sealing a fluid, which may be at an extremely high pressure, from or in a receptacle, and then for permitting the flow of the fluid into or out of the receptacle, respectively, when desired. Such a device has application in any number of operations where an almost instantaneous flow of high velocity fluid is desirable. One application, for example, is in a shock tunnel to study the reaction of aerodynamic shapes in high speed air flows where it is important that no fragments enter the tunnel, as shown in U.S. Patent 3,184,097, issued to Kilmer et al., on May 18, 1965. A second use of such a device is to contain a high pressure fluid within a receptacle and then to release the fluid so as to act as a safety valve thereby preventing damage to the receptacle. Sealing devices may, thirdly, be used to seal a compartment in either a submerged weapon or a seawater battery and then to flood such compartment at some later time. Although the pressures involved in these various environments are oftentimes too high for presently available valving apparatus, rupture disc devices have been utilized in a number of different techniques to handle the problem. Rupture discs traditionally have been employed for the protection of pressure vessels and other equipment. These traditional types have normally included a domeshaped, frangible diaphragm designed to rupture at a predetermined pressure differential, an example of which is shown in U.S. Patent 3,005,573 issued to Dawson et al. on Oct. 24, 1961. However, these conventional rupture discs are not entirely suitable in a variety of uses because they are designed to rupture at a predetermined pressure differential and not at the command of an operator. Furthermore, small variations in rupture pressures between individual discs and the inability to confine the fluid at the desired rupture pressure for a period of time prior to release, have rendered such discs unsuitable for many purposes. Another technique, which has been attempted with rupture discs, involves the use of an explosive driver to punch out an opening in the disc. In this technique, however, the driver is generally rather bulky and occupies space urgently needed for other components. Still another use of a rupture disc is that shown by U.S. Patent 3,109,553, issued to Fike on Nov. 5, 1963, in which a dome-shaped diaphragm, scored with an X on the concave surface, has a plurality of strips of explosive material secured to the convex surface in direct opposition and substantially coextensive in length with the scored X. This device has not proved altogether satisfactory in use since the edges of the diaphragm petals tend to curl inward toward the concave side thereby preventing complete opening with the resulting obstruction tending to cause a restriction of the fluid flow past the disc.

SUMMARY OF THE INVENTION

Accordingly, one object of this invention is the provision of a rupture disc unit capable of withstanding high pressures for indefinite periods of time, yet capable of being ruptured under the control of an operator to permit the flow of fluid past the disc when desired.

Another object is to provide a rupture disc unit capable of permitting an almost instantaneous release of high pressure fluid into or from a receptacle.

Yet another object of the invention is the provision of a rupturable disc which will open almost instantaneously from a completely closed position to an open position having essentially no restrictions in the flow path.

Still another object is to provide a rupture disc unit which substantially eliminates fragmentation.

A further object of the present invention is the provision of a plate member capable of rupturing along predetermined lines to allow for substantially uniform flow of fluid through the member upon rupture thereof and having substantially no obstruction of the flow therethrough.

A still further object is to provide explosive means on a rupture disc for selectively effecting the rupture of the disc thereby permitting the operator to be at safe distance from the disc at the time of rupture.

Another still further object of the present invention is the provision of means to effect a more complete opening of a rupture disc which is restraining high pressure fluid.

Briefly, in accordance with one embodiment of this invention, these and other objects are attained by providing in a rupture disc a scored pattern in the form of a U with explosive material disposed adjacent the U-shaped pattern so that the central space delineated by the U will fold away along a line joining the ends of the U.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
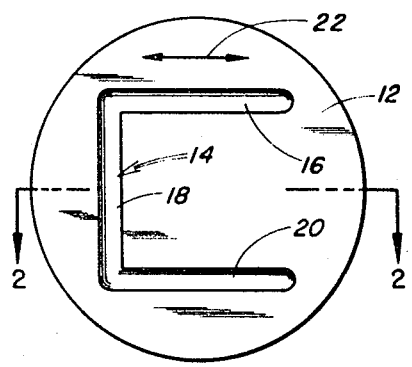
FIG. 1 is a plan view of a preferred embodiment of the rupture disc of the invention.
Figure 2:
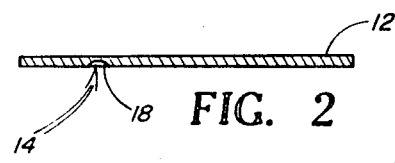
FIG. 2 is a section of the rupture disc taken on the line 2—2 of FIG. 1 looking in the direction of the arrows.

Referring now to the drawings wherein like reference characters designate identical or corresponding parts throughout the several views, and more particularly to FIGS. 1 and 2 thereof wherein the rupture disc unit of the present invention comprises a rupture disc or plate 12 of a suitable thickness and material, for example 0.035″ stainless steel type 304, in the shape of a circle of a suitable diameter, for example 2.500″. A groove 14 of a suitable cross-sectional shape, for example arcuate, is scored into one face of the plate in the shape of a U by any conventional technique, as by machining with a 0.156" diameter ball mill. The groove may be milled to any suitable depth, for example 0.025", depending upon the conditions of intended use, such as maximum differential pressure, the plate thickness and material selected. The U-shaped groove comprises three substantially linear portions 16, 18 and 20 which, according to the preferred embodiment, are of an equal length, for example 1.312". Linear portions 16 and 20 of the U-shaped groove are parallel to each other and are preferably disposed in the direction of the grain of the plate material as represented by line 22; linear portion 18 of the U-shaped groove preferably meets linear portions 16 and 20 at right angles and is, therefore, normal to the grain 22.

Figure 3:
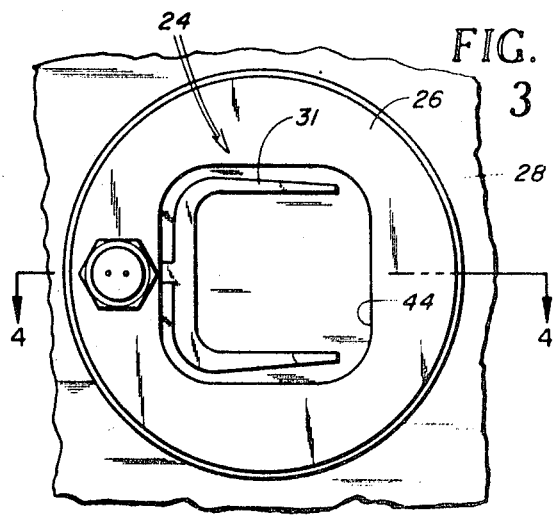
FIG. 3 is a plan view of the rupture disc unit of the present invention as it is mounted according to the preferred embodiment.
Figure 4:
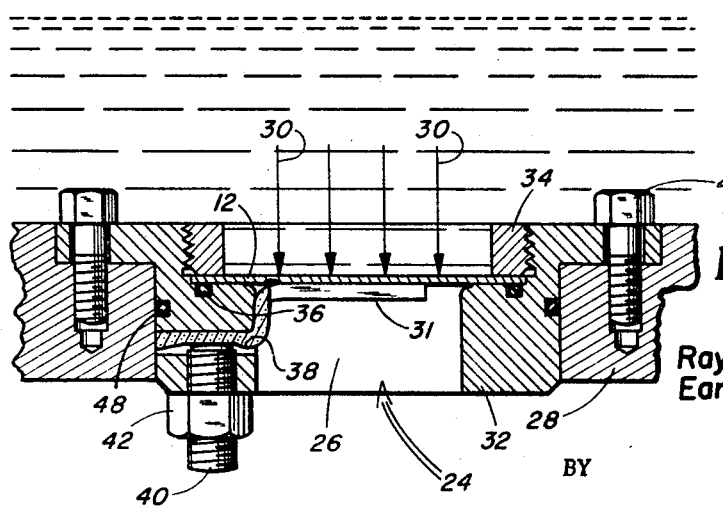
FIG. 4 is a section of the apparatus taken on the line 4—4 of FIG. 3 looking in the direction of the arrows; and, FIG. 5 is a perspective view of the rupture disc of the present invention and of the prior art after actuation thereof.

Referring now to FIGS. 3 and 4, the rupture disc unit 24 of the present invention is shown mounted within a port 26 of a receptacle 28 thereby forming a barrier to a high pressure fluid exerting a force in the direction of arrowheads 30. An explosive material 31, which may be that material manufactured and sold by E. I. du Pont de Nemours & Co., Wilmington, Del., under the trademark Deta Sheet cut from sheet stock, in the form of a fork is secured to plate 12 by any conventional means, as by bonding the tines of the fork with, for example, the bonding agent manufactured and sold by Eastman Kodak Co. under the trademark Eastman 910. It is readily apparent that a number of other explosive materials and/or bonding agents could be used in the present invention. The explosive material may be bonded to either the grooved face or the flat face of the plate so long as the explosive material is properly aligned so as to be substantially overlying the groove and substantially coextensive therewith. In the preferred embodiment, the tines of the fork-shaped explosive material are secured to the grooved face of the plate within the groove and the plate is positioned in the receptacle with the grooved face of plate 12 on the low pressure side of the receptacle; hence, the explosive material is protected from the high pressure fluid which may be water or some highly reactive fluid. The plate 12 is secured in a holder 32 by an externally threaded retaining nut 34. A fluid tight seal is provided between the holder and the plate by any conventional sealing means, such as an O-ring 36. The handle of the fork-shaped explosive material is appropriately shaped and inserted in an aperture 38 in holder 32, and a detonator 40 is threaded into the holder in close proximity with the fork handle. A lock nut 42 is threaded onto detonator 40 and abuts holder 32 to additionally secure the detonator in position. The holder has a rounded opening on the high pressure side and a substantially rectangular opening 44 on the low pressure side. Holder 32 is secured to receptacle 28 by conventional means, such as bolts 46 and a fluid-tight seal is maintained therebetween by an O-ring 48.

In operation U-shaped groove 14 is machined into plate 12 and explosive material 31 is cut from sheet stock in the form of a fork. The tines of the fork are bonded over the U-shaped groove, and plate 12 is then placed in holder 32 and secured therein by retaining nut 34. The handle of the fork is inserted in aperture 38 and detonator 40 is added and locked in place by lock nut 42. The rupture disc unit 24 is assembled into port 26 of receptacle 28 and then subjected to high pressure fluid. Upon command from an operator, an electrical voltage is applied to detonator 40 by lead wires (not shown), and the detonator is fired. The detonation proceeds through the fork handle, which serves as an explosive lead and then splits and proceeds through the tines. This detonation causes the plate to rupture along the U-shaped groove. Due to the force exerted by the high pressure fluid, the central portion of the plate delineated by the groove folds along a line joining the open ends of the U and opens toward the low pressure side, whereupon the high pressure fluid flows through the port.

Figure 5:
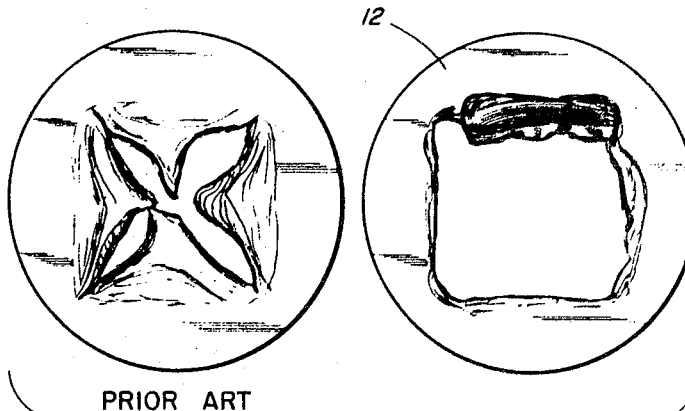

As can be seen from FIG. 5 the rupture disc of the present invention fully opens upon actuation thereby permitting a maximum cross-sectional area and a resulting maximum flow rate, whereas the petals of the prior art explosive rupture disc tend to curl toward the concave side and prevent a complete opening thereby obstructing the flow and causing a reduction in flow rate.

Obviously, numerous modifications and variations of the present invention are possible in the light of the above teachings. By way of example, many different metals may be used to fabricate the rupture disc, and the groove may be placed on either face or on both faces of the plate provided there is proper alignment between the groove or grooves, and the explosive material. Moreover, although the detonator and explosive material have been shown as being placed on the low pressure side of the rupture disc so as to protect them from the high pressure fluid, they may be as easily positioned on the opposite side if desired. Depending on the differential pressure contemplated, several parameters such as disc material and thickness, as well as groove depth, may be varied from the examples suggested.

What is claimed as new and desired to be secured by Letters Patent of the United States is:

1. A rupture disc adapted to form a fluid seal across a port in a receptacle comprising
   a flat metal plate having a U-shaped groove formed in at least one face thereof for defining a pattern of weakness, the side arms of said groove being disposed parallel to the grain of said plate, and
   explosive means for effecting bursting of said plate along said pattern of weakness thereby breaking said seal.

2. A rupture disc according to claim 1 wherein said explosive means comprises explosive material overlying said groove.

3. A rupture disc according to claim 1 wherein said U-shaped groove is of an arcuate cross-sectional configuration.

References Cited

UNITED STATES PATENTS

| | | |
|---|---|---|
| 2,553,267 | 5/1951 | Nedoh. |
| 3,109,553 | 11/1963 | Fike et al. |
| 3,184,097 | 5/1965 | Kilmer et al. |
| 3,195,769 | 7/1965 | Miller. |
| 3,363,801 | 1/1968 | Fike. |

RAPHAEL H. SCHWARTZ, Primary Examiner